United States Patent
Richardson et al.

(10) Patent No.: US 8,342,489 B1
(45) Date of Patent: Jan. 1, 2013

(54) HANDLEBAR VIBRATION DAMPING ASSEMBLY

(76) Inventors: Donald G. Richardson, Henderson, NV (US); Brian C. Falter, Henderson, NV (US)

(*) Notice: Subject to any disclaimer, the term of this patent is extended or adjusted under 35 U.S.C. 154(b) by 521 days.

(21) Appl. No.: 12/590,675

(22) Filed: Nov. 12, 2009

Related U.S. Application Data

(60) Provisional application No. 61/198,876, filed on Nov. 12, 2008.

(51) Int. Cl.
*F16F 5/00* (2006.01)

(52) U.S. Cl. .................. 267/140.11; 74/551.9

(58) Field of Classification Search .......... 267/140.11, 267/140.4, 136; 74/551.9, 551.1, 551.8; 280/274, 281.1, 288.4; 180/219
See application file for complete search history.

(56) References Cited

U.S. PATENT DOCUMENTS

| | | | |
|---|---|---|---|
| 3,767,181 A | 10/1973 | Van Der Burgt et al. | |
| 4,494,634 A | 1/1985 | Kato | |
| 4,744,547 A | 5/1988 | Hartel | |
| 5,022,201 A | 6/1991 | Kobori et al. | |
| 5,201,244 A * | 4/1993 | Stewart et al. | 74/551.3 |
| 5,410,845 A | 5/1995 | Sakamoto et al. | |
| 5,620,068 A | 4/1997 | Garnjost et al. | |
| 5,814,963 A | 9/1998 | Girard et al. | |
| 5,906,254 A | 5/1999 | Schmidt et al. | |
| 6,009,986 A | 1/2000 | Bansemir et al. | |
| 6,101,453 A | 8/2000 | Suwa et al. | |
| 6,427,815 B1 | 8/2002 | Zeller | |
| 6,834,565 B2 * | 12/2004 | Cohen et al. | 74/551.9 |
| 6,954,686 B2 | 10/2005 | Bourg et al. | |
| 2005/0257978 A1 * | 11/2005 | Sigfrid | 180/219 |
| 2005/0279598 A1 * | 12/2005 | McPherson | 188/378 |
| 2007/0176392 A1 * | 8/2007 | Schiffer et al. | 280/272 |

* cited by examiner

*Primary Examiner* — Pamela Rodriguez
(74) *Attorney, Agent, or Firm* — Albert O. Cota

(57) ABSTRACT

A handlebar vibration damping assembly (HVDA) (10) that is used in combination with a conventional two-wheeled vehicle's handlebar (80) assembly having a right grip (82), a left grip (84) and a center section (86). The HVDA (10) is comprised of a weight (12) having a first end (14), a second end (16), an outer surface (18) and a cavity (20) that extends into the second end (16). A spring (22) has a first end (24) and a second end (26), with the first end (24) inserted into the cavity (20) on the weight's second end (16). In order to maintain the HVDA (10) within the handlebar, a bolt (32) having a head (34) and a tip (36) along with an insert (38) having a bore (40), an insert nut (44) and a second nut (48) are utilized. The second end (26) of the spring (22) extends into the insert bore (40). Once the HVDA (10) is securely placed within the handlebar (80) the weight (12) can vibrate in any excitable direction 90-degrees of the centerline of the handlebar and can oscillate at different frequencies.

9 Claims, 2 Drawing Sheets

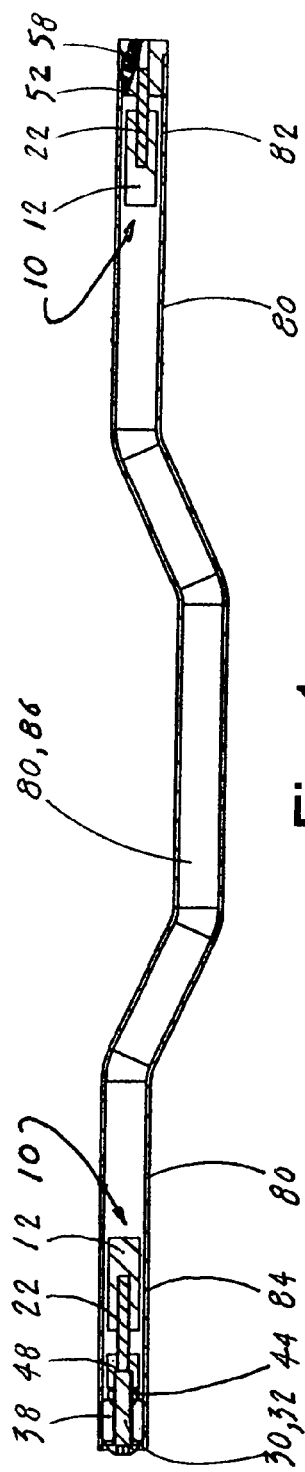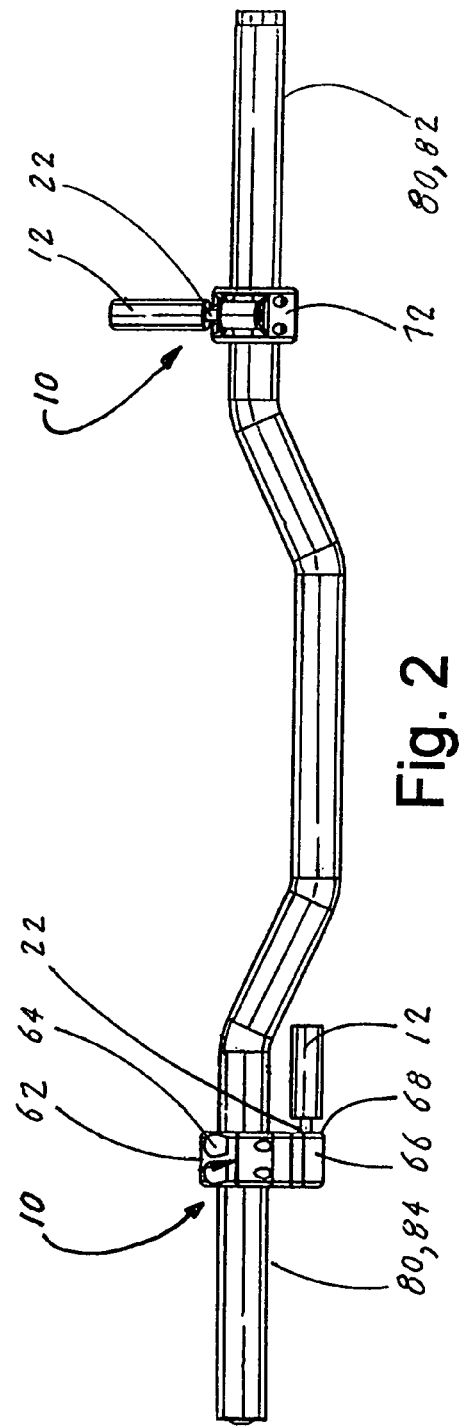

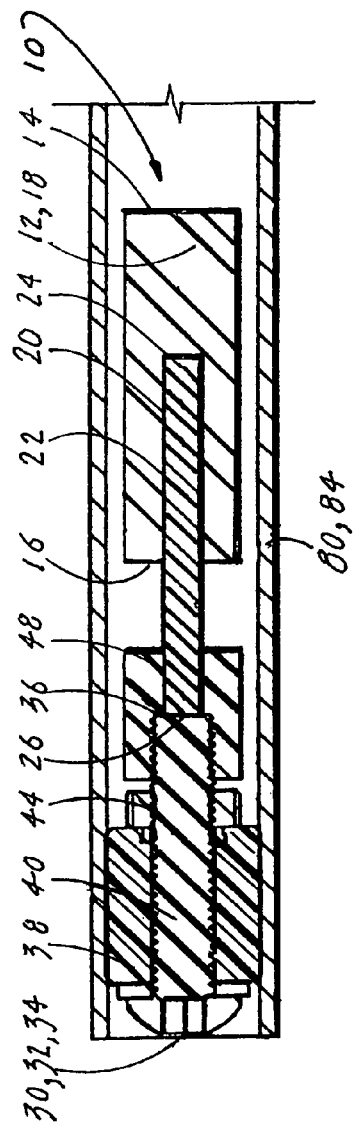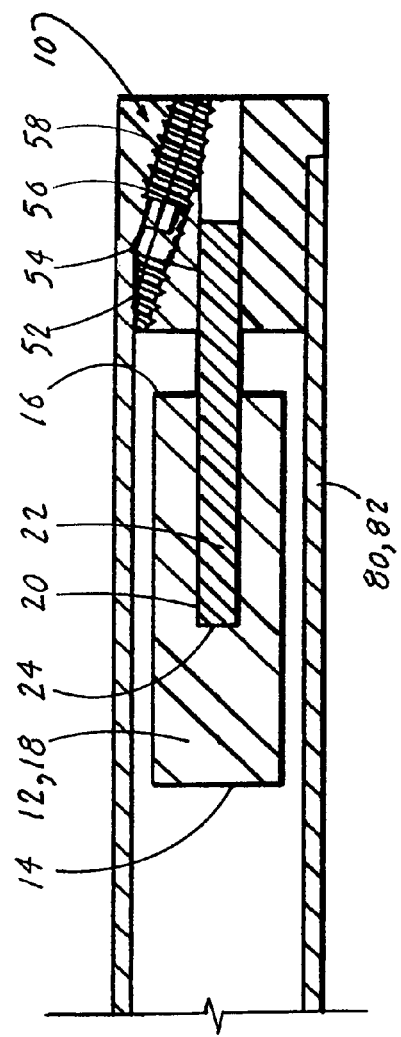

HANDLEBAR VIBRATION DAMPING ASSEMBLY

This application claims priority of Provisional Application No. 61/198,876 filed Nov. 12, 2008.

TECHNICAL FIELD

The invention generally pertains to vibration damping systems, and more particularly to a handlebar vibration damping assembly that is specially designed for use on two-wheeled vehicles such as motorcycles.

BACKGROUND ART

There are many vehicles that utilize handlebars for control. Some examples of these vehicles are motorcycles including dirtbikes and three-wheeled versions, all terrain vehicles (ATVs), personal watercraft such as jetskis, snowmobiles and bicycles. All of these vehicles can provide a common problem: A significant vibration that is felt by a person through the handlebar.

The vibration is primarily caused by the constant engine vibration, although road and suspension inputs also contribute to a lesser degree. A similar problem exits in helicopter rotorheads, which also experience a constant vibratory input, and therefore must utilize a tuned mass damper Vibrations cause involuntary muscle firing at the same frequently as the vibration input. A person's nervous system vibration reflex typically requires one vibration to "lock onto". The one vibration would be the resonant frequency of the handlebar. The result is the person experiencing significant hand numbness and tingling. Unfortunately, for most people who routinely experience these effects, it is simply accepted as a result that can not be alleviated. Even when it becomes a dangerous effect, such as for professional motorcycle/dirtbike or bicycle riders, there is no solution to the problem. There have been attempts to provide some type of vibration damping, but most of these have not been very successful.

Obviously, there is a need to provide an effective means of vibration damping that can be easily implemented. By reducing or eliminating the level of harmonic resonance in handlebars, the effectiveness, comfort and duration of a person holding the handlebars is greatly increased.

A search of the prior art did not disclose literature or patents that read directly on the claims of the instant invention. However, the following U.S. patents are considered related.

| Pat. No. | INVENTOR | ISSUED |
| --- | --- | --- |
| 5,814,963 | Girard, et al | 29 Sep. 1998 |
| 6,009,986 | Bansemir, et al | 4 Jan. 2000 |
| 6,954,686B2 | Bourg, et al | 11 Oct. 2005 |

The U.S. Pat. No. 5,814,963 discloses a device for damping the vibrations of a structure subjected to dynamic stresses. The invention includes a main mass mounted on an elastic plate which is itself fitted into the structure whose vibrations are to be damped. The damping device additionally comprises at least one auxiliary mass that is connected to the main mass and is capable of being moved at least substantially parallel to the elastic plate as a function of the control pulses which are received from a computer.

The U.S. Pat. No. 6,009,986 discloses a mass damper for a dynamically excited part including a housing connected in a vibration-free manner with the part and a spring-mass system that can vibrate in the direction of the excitation of the part. The spring-mass system comprises a leaf-spring arrangement tensioned firmly to the housing on one side and provided on the other side at the free spring end with an inertial mass. Resonance adjustment is performed in a structurally simple and problem-free manner, solely by control interventions on the housing side and without mass shifts in the spring-mass system.

The U.S. Pat. No. 6,954,686 discloses a method of tuning a vibration absorber on a driving frequency, in which the absorber includes a damper block secured to a support having one end fixedly mounted in an orifice. The invention includes a measurement step for estimating the offset between the tuned frequency of the absorber and the driving frequency in order to produce a reference value; and an adjustment step of adjusting at least one adjustment value of the absorber to the reference value.

For background purposes and as indicative of the art to which the invention relates, reference may be made to the following remaining patents found in the search.

| Pat. No. | INVENTOR | ISSUED |
| --- | --- | --- |
| 3,767,181 | Van Der Burgt, et al | October 1973 |
| 4,494,634 | Kato | January 1985 |
| 4,744,547 | Hartel | May 1988 |
| 5,022,201 | Kobori, et al | June 1991 |
| 5,410,845 | Sakamoto, et al | May 1997 |
| 5,620,068 | Garnjost, et al | April 1997 |
| 5,906,254 | Schmidt, et al | May 1999 |
| 6,101,453 | Suwa, et al | August 2000 |
| 6,427,815 | Zeller | August 2002 |

DISCLOSURE OF THE INVENTION

A handlebar vibration damping assembly that is used in combination with a conventional two-wheeled vehicle's handlebar assembly having a right grip, a left grip and a center section, wherein the handlebar vibration damping assembly is comprised of:
  a. a weight having a first end, a second end, an outer surface and a cavity that extends into the second end,
  b. a spring having a first end and a second end, with the first end inserted into the cavity that extends into the weight's second end,
  c. a bolt having a head and a tip,
  d. an insert having a bore,
  e. an insert nut, and
  f. a second nut.

Once the handlebar vibration damping assembly is securely placed within the handlebar, the weight can vibrate in any excitable direction 90-degrees of the centerline of the handlebar. The weight can also oscillate at different frequencies as a result of varying external vibrations.

In view of the above disclosure, the primary object of the invention is to provide a handlebar vibration damping assembly that will significantly reduce vibrations which are felt through the handlebars of a two-wheeled vehicle such as a motorcycle.

In addition to the primary object of the invention, it is also an object of the invention to provide a handlebar vibration damping assembly that:
  can be used with any vehicle that has handlebars, can be used with swung objects such as baseball bats,
can be sold as an OEM product or an aftermarket kit,
is maintenance free,
is easy to install,
can be made in various sizes to accommodate large and small handlebar assemblies,
is cost effective from both a manufacturer's and consumer's point of view.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a front elevational and cross-sectional view showing a soft mounted handlebar vibration damping assembly inserted within the left grip of a vehicle handlebar, and a hard mounted handlebar vibration damping assembly inserted within the right grip of a vehicle handlebar.

FIG. 2 is a front elevational view showing two external mounting arrangements of the handlebar vibration damping assembly.

FIG. 3 is a cross-sectional view of the hard mounted handlebar vibration damping assembly inserted within the right grip of a vehicle handlebar.

FIG. 4 is a cross-sectional view of the soft mounted handlebar vibration damping assembly inserted within the left grip of a vehicle handlebar.

BEST MODE FOR CARRYING OUT THE INVENTION

The best mode for carrying out the invention is presented in terms of a preferred embodiment with three design configurations of a handlebar vibration damping assembly (hereinafter "HVDA 10"). As shown in FIGS. 1-4, the HVDA 10 is designed to provide a spring-mass system that significantly reduces vibrations which are felt through the handlebars of a vehicle such as a motorcycle. Most two-wheeled vehicles such as motorcycles provide shock absorbers for the wheels and forks, but neglect to provide any vibration or shock absorbent on the handlebars.

The first and second design configurations of the HVDA 10 are internally mounted within a vehicle's handlebars. The third design configuration of the HVDA 10 is mounted externally to the handlebars.

The first design configuration, as shown in FIGS. 1 and 4, is comprised of the following major elements: a weight 12, a spring 22 and attachment means 30 for attaching the weight 12 and spring 22 within a vehicle's handlebars 80. For clarity, a vehicle's handlebars 80 having a right grip 82, a left grip 84 and a center section 86 are also disclosed.

The weight 12, as shown in FIGS. 1 and 4, is comprised of a first end 14, a second end 16, an outer surface 18 and a cavity 20 that extends into the weight 12 from the second end 16. The weight 12 is made of a material that is selected from the group consisting of metal, that preferably consists of stainless steel, plastic and carbon fiber.

The spring 22, as also shown in FIGS. 1 and 4, is comprised of a first end 24 and a second end 26. The first end 24 of the spring 22 is inserted into the cavity 20 on the second end 16 of the weight 12, thereby creating an integrated weight/spring unit. Preferably, the spring 22 is inserted into the weight 12 during the manufacturing process and is frictionally held therein. The spring 22 is made of a material that is selected from the group consisting of metal, that preferably consists of spring steel, plastic and carbon fiber.

As shown in FIG. 1, extending inward from the right grip 82 or the left grip 84 of the handlebar 80 is the attachment means 30.

In this first design configuration, the attachment means 30 is comprised of a bolt 32 having a head 34 and a tip 36. The bolt 32 is inserted into the handlebar 80 via the right grip 82 or the left grip 84. For this disclosure, the first design configuration is located within the left grip 84, as shown in FIG. 1. Surrounding substantially two-thirds of the bolt's length from the head 34 down the shaft is an insert 38. The insert 38 has a bore 40 that allows the bolt 32 to pass therethrough. The insert 38 can be made of a soft resilient material or a hard material. The soft resilient material is selected from the group consisting of rubber, an elastomer and plastic. The hard material is selected from the group consisting of concrete, metal or wood.

As shown in FIGS. 1 and 4, the insert 38 is dimensioned to snugly fit within the handlebar 80. The insert 38 is compressed as much as possible to provide maximum support for the spring 22. The more the inert 38 is preloaded/tightened, the better the insert 38 transfers the vibratory energy to the weight 12. Located adjacent to the insert 38 is an insert nut 44 which is screwed on the bolt 32 after the bolt has been inserted through the insert 38. As also shown in FIGS. 1 and 4, the insert nut 44 maintains the insert 38 in position surrounding the bolt 32. Located at and extending outward from the bolt's tip 36 is a second nut 48. As best shown in FIG. 2, the second nut 48 is dimensioned to allow it to be screwed substantially half-way onto the bolt 32. In this manner the remaining one-half of the second nut 48 extends outward from the bolt's tip 36. The second end 26 of the spring 22 is then inserted into the nut 48 and the spring's second end 26 travels until it interfaces with the tip 36 of the bolt 32. After the spring 22 is inserted completely into the second nut 48, the spring 22 is securely maintained thereby by friction.

Once the HVDA 10 is placed within a handlebar 80, the weight 12 can vibrate in any excitable direction 90-degrees of the centerline of the handlebar. The weight 12 can also oscillate at different frequencies as a result of varying external vibrations from the vehicle's engine and/or chassis, especially when encountering road surface irregularities.

As previously stated, the second design configuration of the HVDA 10 is similar to the first configuration in that they are both internally mounted within a handlebar 80. The main difference between the first and second design configurations is that the first configuration is considered rubber, or soft, mounted as a result of the use of the elastomeric insert. The second configuration is considered hard mounted due to the lack of an elastomeric insert.

The second design configuration of the HVDA 10, as shown in FIGS. 1-3 located within the right grip 82 of a handlebar 80, is comprised of similar elements to the first configuration. There is the weight 12 having a first end 14, a second end 16 and an outer surface 18. A cavity 20 extends inward from the weight's second end 16. There is also the spring 22 having a first end 24 and a second end 26, with the first end 24 inserted into and frictionally held within the cavity 20 that extends into the weight 12.

As shown in FIGS. 1 and 3, the attachment means 50 for this design configuration is comprised of a non-resilient insert 52 that is located within and adjacent to the end of the handlebar's right grip 82.

The insert 52 has a cavity 54 into which the second end 26 of the spring 22 is inserted and frictionally held. The insert 52 also has a screw bore 56 that angularly extends into the cavity 52. In order to function, a screw bore 56 must also extend through the handlebar 80. Once the two screw bores 56 are created and aligned, a screw 58, which is preferably an Allen head screw, is inserted through the handlebar 80 and into the insert 52 as shown in FIG. 3. As also shown in FIG. 3, the screw 58 must be inserted at an angle to facilitate the adequate tightening of the screw relative to the position and location of the handlebar's right grip 82 and the insert 52 therein.

As with the first configuration, once the second design configuration of the HVDA 10 is mounted within the handlebar, the weight 12 can vibrate and oscillate as a result of varying external vibrations from the vehicle's engine and/or chassis.

The third design configuration of the HVDA 10 is significantly different than the first and second configurations, in that the third configuration is externally mounted on a handlebar 80. Additionally, there are two mounting arrangements that may be utilized.

The first mounting arrangement, as shown in FIG. 2 attached to the left grip 84 of a handlebar 80, is comprised of a clamp 62 and at least one nut and bolt combination 64. As shown in FIG. 2, the clamp 62 is specially designed and fabricated to have a section 66 extending inward relative to the handlebar 80. Extending into the section 66 at either edge is a cavity 68. A weight 12 of any shape to fit the required application is then attached to a spring 22, with the spring 22 then inserted into the cavity 68. The clamp 62 is maintained on the handlebar 80 by tightening the nut and bolt combination 64. Other than the extending section 66, the clamp 62 is a typical bifurcated clamp which is well known in the art. It should be noted that although the section 66 extends inward in this disclosure, the section 66 can also extend outward, upward or downward relative to the handlebar, with the functionality remaining the same.

The second mounting arrangement, as shown in FIG. 2 attached to the right grip 82 of a handlebar 80, is also comprised of a weight 12 and spring 22. The second mounting arrangement also utilizes a clamp 72 with a nut and bolt combination 64 for maintaining the HVDA 10 on the handlebar 80. There is no extending section on the clamp 72. Instead, the clamp 72 is specialty designed and fabricated to allow the spring 22 to be inserted into and held within the clamp 72. As shown in FIG. 2, the second mounting arrangement maintains the weight 12 and spring 22 in a 90-degree perpendicular orientation to the handlebar 80. Regardless of which mounting arrangement is utilized, the functionality of the HVDA 10 is the same. As the vehicle experiences varying vibrations, the weight 12 can oscillate at different frequencies, thereby reducing the vibrations felt by a person riding the vehicle.

While the invention has been described in detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

The invention claimed is:

1. A handlebar vibration damping assembly that is used in combination with a conventional two-wheeled vehicle's handlebar assembly which has a right grip, a left grip and a center section, wherein said handlebar vibration damping assembly is comprises of a weight having a first end, a second end, an outer surface, and a cavity; a spring having a first end and a second end, with the first end of the spring inserted into the cavity on said weight; and attachment means for securely maintaining said handlebar vibration damping assembly within the handlebar, wherein the attachment means is comprised of an elastomeric insert that is compressed within the handlebar, wherein the second end of said spring is inserted into a cavity on said insert and is held therein by a press fit.

2. A handlebar vibration damping assembly that is used in combination with a conventional two-wheeled vehicle's handlebar assembly having a right grip, a left grip and a center section, wherein said handlebar vibration damping assembly is comprised of:
   a) a weight having a first end, a second end, an outer surface and a cavity that extends into the second end,
   b) a spring having a first end and a second end, wherein the first end is inserted into the cavity that extends into said weight's second end,
   c) a bolt having a head and a tip,
   d) an insert having a bore, wherein the second end of said spring extends into the bore,
   e) an insert nut, and
   f) a second nut, wherein once said handlebar vibration damping assembly is placed within the handlebar, said weight can vibrate in any excitable direction 90-degrees of the centerline of the handlebar, and said weight can oscillate at different frequencies as a result of varying external vibrations.

3. The handlebar vibration damping assembly as specified in claim 2 wherein the handlebar assembly is used on a powered two-wheeled vehicle that is selected from the group consisting of a motorcycle, a dirtbike, an all-terrain vehicle (ATV), and a bicycle.

4. The handlebar vibration damping assembly as specified in claim 2 wherein said weight is made of a material that is selected from the group consisting of metal, plastic, and carbon fiber.

5. The handlebar vibration damping assembly as specified in claim 2 wherein said spring is made of a material that is selected from the group consisting of metal, plastic and carbon fiber.

6. The handlebar vibration damping assembly as specified in claim 2 wherein said spring is frictionally held within the cavity on said weight.

7. The handlebar vibration damping assembly as specified in claim 2 wherein said insert is made of a soft, resilient material that is selected from the group consisting of rubber, an elastomer and plastic.

8. The handlebar vibration damping assembly as specified in claim 2 wherein said insert is made of a hard material that is selected from the group consisting of concrete, metal and wood.

9. A handlebar vibration damping assembly that is used in combination with a conventional two-wheeled vehicle's handlebar assembly having a right grip, a left grip and a center section, wherein said handlebar vibration damping assembly is comprised of:
   a) a weight having a first end, a second end, an outer surface and a cavity that extends into the second end,
   b) a spring having a first end and a second end, wherein the first end of the spring is inserted into the cavity that extends into said weight's second end,
   c) a bolt having a head and a tip,
   d) an insert having a bore, wherein the second end of said spring extends into the bore,
   e) an insert nut,
   f) a second nut, wherein once said handlebar vibration damping assembly is placed within the handlebar, said weight can vibrate in any excitable direction 90-degrees of the centerline of the handlebar, and said weight can oscillate at different frequencies as a result of varying external vibrations, and g) an attachment means for securely maintaining said handlebar vibration damping assembly within the handlebar, wherein said attachment means is comprised of the insert that is preloaded prior to insertion within the handlebar and that surrounds substantially two-thirds of said bolt's length from the head down the shaft, wherein said bolt is inserted into the handlebar via the right grip or the left grip and said insert having a bore that allows said bolt to pass therethrough, wherein located adjacent to said insert nut which is screwed onto said bolt after said bolt has been inserted through said insert, wherein the insert nut maintains said insert in position surrounding said bolt, wherein extending outward from said bolt's tip is the second nut which is dimensioned to be screwed substantially half-way onto said bolt, wherein the second end of said spring is then inserted into the second nut and said spring's second end travels until it interfaces with the tip of said bolt, wherein once said spring is inserted completely into the second nut, said spring is securely maintained therein.

* * * * *